(12) United States Patent
Santra et al.

(10) Patent No.: US 7,530,394 B2
(45) Date of Patent: May 12, 2009

(54) CEMENT COMPOSITIONS FOR LOW TEMPERATURE APPLICATIONS

(75) Inventors: Ashok K. Santra, Duncan, OK (US); Rocky Fitzgerald, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 292 days.

(21) Appl. No.: 11/427,872

(22) Filed: Jun. 30, 2006

(65) Prior Publication Data

US 2008/0000640 A1   Jan. 3, 2008

(51) Int. Cl.
- *E21B 33/14* (2006.01)
- *E21B 33/16* (2006.01)
- *C04B 9/02* (2006.01)
- *C09K 8/46* (2006.01)
- *C09K 8/467* (2006.01)

(52) U.S. Cl. ............... 166/292; 106/685; 106/690; 106/819; 166/291; 166/300; 175/72; 507/269; 507/274

(58) Field of Classification Search .............. None
See application file for complete search history.

(56) References Cited

U.S. PATENT DOCUMENTS

| | | | |
|---|---|---|---|
| 1,946,327 A * | 2/1934 | Matsuura | 106/683 |
| 2,543,959 A * | 3/1951 | Eastin | 106/685 |
| 4,838,941 A | 6/1989 | Hill | |
| 5,213,161 A | 5/1993 | King et al. | |
| 5,220,960 A | 6/1993 | Totten et al. | |
| 5,281,270 A | 1/1994 | Totten et al. | |
| 5,294,649 A * | 3/1994 | Gerber | 523/145 |
| 5,298,069 A | 3/1994 | King et al. | |
| 5,346,012 A | 9/1994 | Heathman et al. | |
| 5,588,488 A | 12/1996 | Vijn et al. | |
| 5,718,292 A | 2/1998 | Heathman et al. | |
| 5,913,364 A | 6/1999 | Sweatman | |
| 6,167,967 B1 | 1/2001 | Sweatman | |
| 6,258,757 B1 | 7/2001 | Sweatman et al. | |
| 6,488,763 B2 | 12/2002 | Brothers et al. | |
| 6,561,273 B2 | 5/2003 | Brothers et al. | |
| 6,664,215 B1 | 12/2003 | Tomlinson | |
| 6,739,806 B1 | 5/2004 | Szymanski et al. | |

(Continued)

FOREIGN PATENT DOCUMENTS

FR   1161019   8/1958

(Continued)

OTHER PUBLICATIONS

Foreign Communication from a counterpart application—International Search Report and Written Opinion of PCT/GB2007/002376 (9 pgs) dated Dec. 12, 2007.

(Continued)

*Primary Examiner*—George Suchfield
(74) *Attorney, Agent, or Firm*—Craig W. Roddy; Conley Rose, P.C.

(57) ABSTRACT

A method of servicing a wellbore comprising placing in the wellbore a cement composition comprising light-burned magnesium oxide, water and an alkaline metal chloride, and allowing the composition to set. A method of cementing comprising preparing a cement composition comprising a light-burned magnesium oxide, water and an alkaline metal chloride, and allowing the composition to set.

20 Claims, 3 Drawing Sheets

U.S. PATENT DOCUMENTS

| | | | |
|---|---|---|---|
| 6,904,971 | B2 | 6/2005 | Brothers et al. |
| 6,962,201 | B2 | 11/2005 | Brothers |
| 7,036,586 | B2 | 5/2006 | Roddy et al. |
| 7,044,222 | B2 * | 5/2006 | Tomlinson .................. 166/292 |
| 7,067,000 | B1 | 6/2006 | Szymanski et al. |
| 7,147,055 | B2 | 12/2006 | Brothers et al. |
| 2004/0040711 | A1 * | 3/2004 | Tomlinson .................. 166/292 |
| 2005/0016421 | A1 * | 1/2005 | Fujimori et al. ............. 106/691 |
| 2008/0105428 | A1 * | 5/2008 | Santra et al. ................. 166/293 |

FOREIGN PATENT DOCUMENTS

| | | |
|---|---|---|
| WO | 0212638 A1 | 2/2002 |

OTHER PUBLICATIONS

Hewlett, Peter C., "Lea's Chemistry of Cement and Concrete," Elsevier Butterworth-Heinemann, Fourth Edition, 1998, pp. 813-820 plus 2 cover pgs.

Halliburton Brochure: "Flexplug OBM, Lost-Circulation Material" dated Oct. 2005.

Halliburton Brochure: "Flexplug Service, For curing lost circulation, improving wellbore pressure containment and drilling ahead" dated Jul. 2005.

Halliburton Brochure: "Flexplug W, Lost-Circulation Material" dated Oct. 2005.

Halliburton Brochure: "MicroBond, Expanding Additive for Cement" dated Jul. 2006.

Halliburton Brochure: "MicroBond HT, Cement Additive" dated Jul. 2006.

Halliburton Brochure: "Microbond M, Cement Additive" dated Jul. 2006.

Halliburton Brochure: Thermatek Service, Helps meet the challenges of severe lost circulation, near wellbore water shutoffs and . . . dated May 2005.

Halliburton MSDS: R-Tek dated Feb. 6, 2004.

Halliburton MSDS: C-Tek dated Jan. 7, 2004.

* cited by examiner

CEMENT COMPOSITIONS FOR LOW TEMPERATURE APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present disclosure generally relates to well cementing, and more particularly to low temperature cement compositions for use in wellbore servicing.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

A particular challenge in cementing is the development of compressive strength in a cement slurry within a reasonable time period at low temperatures. Cement blends, such as Portland or ultrafine cement blends, have been used with accelerators in an effort to obtain rapid setting of the cement and the development of compressive strength. At low temperatures, e.g., less than about 80° F., an excessive amount of such accelerators have been employed in an effort to facilitate the rapid setting and strength development of a cement composition. However, the addition of an excessive amount of accelerator has often resulted in cement compositions that rapidly form viscous gels with a premature loss of pumpability. Thus, a need exists for cement compositions that rapidly develop compressive strength at lower temperatures.

BRIEF SUMMARY OF SOME OF THE PREFERRED EMBODIMENTS

Disclosed herein is a method of servicing a wellbore comprising placing in the wellbore a cement composition comprising light-burned magnesium oxide, water and an alkaline metal chloride, and allowing the composition to set.

Also disclosed herein is a method of cementing comprising preparing a cement composition comprising a light-burned magnesium oxide, water and an alkaline metal chloride, and allowing the composition to set.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
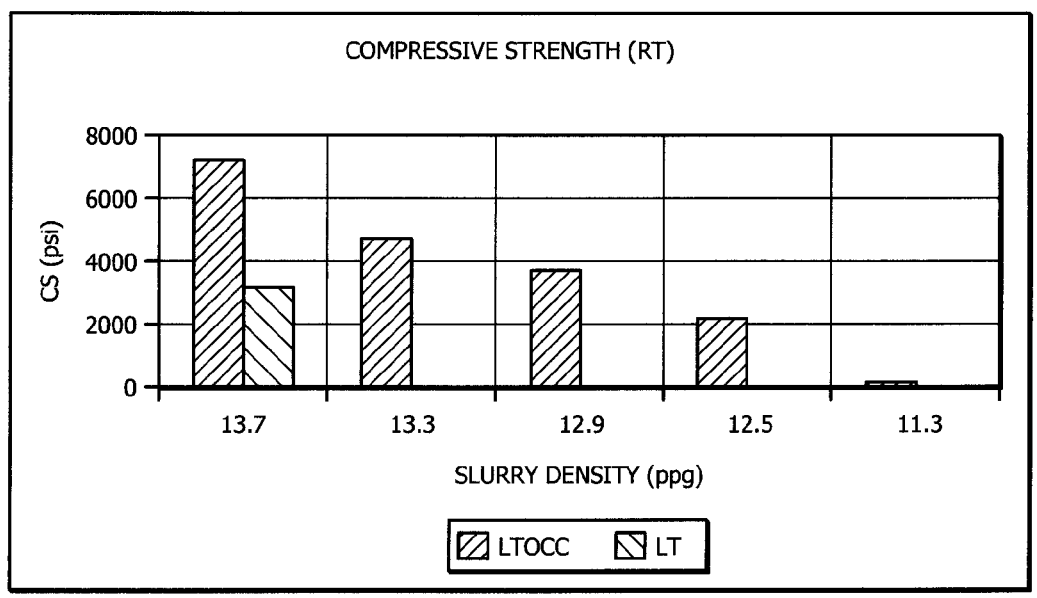
FIG. 1 is a graph of slurry density versus compressive strength for the slurries in Example 1.

Disclosed herein are cement compositions for use in servicing a wellbore. Such compositions may comprise a metal oxide, a metal chloride and water. The cement composition comprising a metal oxide and a metal chloride form a hydraulic cement. Herein hydraulic cement refers to a powdered material that develops adhesive qualities and compressive strength when cured with water. Each of the components of the cement will be described in more detail later herein. In an embodiment, the cement compositions disclosed herein rapidly develop a desirable compressive strength at temperatures equal to or less than about 80° F. Such compositions are referred to hereafter as low temperature oxychloride cement compositions (LTOCCs).

In an embodiment, a LTOCC comprises a metal oxide, alternatively an alkaline earth metal oxide, alternatively magnesium oxide. In an embodiment, the LTOCC comprises MgO. MgO may be prepared by calcination of $Mg(OH)_2$ as depicted in Reaction 1:

Reaction 1

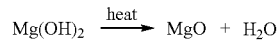

$$Mg(OH)_2 \xrightarrow{heat} MgO + H_2O$$

The calcination of the $Mg(OH)_2$ results in what is commonly referred to as "burned" MgO. Three basic grades of burned MgO are typically produced with the differences between each grade related to the degree of reactivity remaining after being exposed to a range of extremely high temperatures. The original magnesium hydroxide particle is usually a large and loosely bonded particle. Exposure to thermal degradation by calcination causes the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C.-2000° C. the MgO is referred to as "dead-burned" since the majority of the reactivity has been eliminated. Dead-burned MgO has the highest degree of crystallinity of the three grades of burned MgO. An example of a dead-burned MgO includes without limitation THERMATEK™ HT rigid setting fluid which is commercially available from Halliburton Energy Services. A second type of MgO produced by calcining at temperatures ranging from 1000° C.-1500° C. is termed "hard-burned" and displays an intermediate crystallinity and reactivity when compared to the other two grades of burned MgO. An example of a hard-burned MgO includes without limitation THERMATEK™ LT rigid setting fluid which is commercially available from Halliburton Energy Services. The third grade of MgO is produced by calcining at temperatures ranging from 700° C.-1000° C. and is termed "light-burned" or "caustic" magnesia. Light-burned MgO is characterized by a high surface area, a low crystallinity and a high degree of reactivity when compared to the other grades of burned MgO. In an embodiment, the MgO for use in a LTOCC comprises light-burned MgO (LBMO). Without wishing to be limited by theory, the high reactivity of LBMO may allow it to react with the other components of the LTOCC resulting in the rapid formation of a cement composition of appreciable compressive strength at low temperature.

LBMO suitable for use in this disclosure may have a mean particle size of from about 0.1 to 20 microns, alternatively from about 1 to 10 microns, alternatively from about 3 to 5 microns. An LBMO having a particle size in the disclosed range may resist settling when suspended in fluid (i.e. aqueous fluid) thus allowing for an increased availability and reactivity of the LBMO.

In an embodiment, a LTOCC comprises a metal chloride, alternatively an alkaline earth metal chloride, alternatively magnesium chloride ($MgCl_2$). In an embodiment, the LTOCC comprises $MgCl_2$. $MgCl_2$ is well known and available from a wide variety of sources. For example, a suitable $MgCl_2$ for use in this disclosure is C-TEK commercially available from Halliburton Energy Services.

In an embodiment, a cement composition is formed through contacting the LBMO with $MgCl_2$ in the presence of other components to be described in more detail later herein. In an embodiment, a LTOCC may comprise a LBMO and a $MgCl_2$ present in a ratio of from about 150:50 LBMO:$MgCl_2$, alternatively from about 100:50 LBMO:$MgCl_2$, alternatively from about 50:50 LBMO:$MgCl_2$, alternatively from about 40:60 LBMO:$MgCl_2$. The resulting composition comprises a magnesium oxychloride and is a type of cement commonly referred to as a Sorel cement. Magnesium salt based sealant systems typically referred to as Sorel cements, comprising magnesium oxide and a soluble salt, for example magnesium chloride, magnesium sulfate or ammonium mono or dibasic phosphate have been found to be suitable for various wellbore servicing applications such as for example conformance control where the cements are used to control the influx of water into a subterranean formation. A discussion of various magnesia-based cements can be found in Lea's Chemistry of Cement and Concrete by Peter Hewlett: Fourth Edition, pages 813-820: 2003: Elsevier Publishing.

The LTOCC may include a sufficient amount of water to form a pumpable slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement, alternatively from about 36 to about 66 percent by weight of cement wherein the weight of cement is the combined weight of LBMO and $MgCl_2$.

In some embodiments, additives may be included in the LTOCC for improving or changing the properties thereof. Examples of such additives include but are not limited to salts, accelerants, set retarders or inhibitors, defoamers, fluid loss agents, weighting materials, dispersants, vitrified shale, formation conditioning agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art.

In an embodiment, the LTOCC may comprise an optional set retarder or inhibitor. Ihibitors may be used to adjust the time required for setting of the cementitious slurry. Such inhibitors may allow the operator to control the set time of the composition based on the geothermal temperature at which the composition will be used. Increasing the weight percentage of the inhibitor will increase the time required for the composition to undergo the phase transition from a slurry to a set mass with appreciable compressive strength. Inhibitors suitable for use in this disclosure include without limitation sodium hexametaphosphate (technical grade granular), potassium magnesium phosphate hexahydrate, potassium magnesium hexametaphosphate and mixtures thereof. An example of an inhibitor suitable for use in this disclosure is sodium hexametaphosphate commercially available from Deepearth Solutions under the trademark R-TEK.

In an embodiment, the thickening time of the LTOCC may be adjusted through the use of an inhibitor (e.g., sodium hexametaphosphate) such that the composition remains pumpable during downhole placement before rapidly setting. The thickening time refers to the time required for the cement composition to achieve 70 Bearden units of Consistency (Bc). At about 70 Bc, the slurry undergoes a conversion from a pumpable fluid state to a non-pumpable paste. Inhibitors may be present in the LTOCC in a range of from about 0.01% to about 7.0% by weight of the magnesium oxide, alternatively from about 0.1% to about 6%, alternatively from about 0.1% to about 3%.

The LTOCC may have a density from about 4 lb/gallon (ppg) to about 23 ppg, alternatively from about 12 ppg to about 17 ppg, alternatively from about 6 ppg to about 14 ppg. Density reducing additives such as glass beads or foam and expanding additives such as gas, suspension aids, defoamers and the like may be included in the LTOCC to generate a lightweight cement slurry. Amounts of such density-reducing additives and methods for their inclusion are known to one of ordinary skill in the art.

The LTOCC of this disclosure may develop an appreciable compressive strength when placed downhole at low temperatures. Herein the compressive strength is defined as the capacity of a material to withstand axially directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a cement formation attains is a function of both the cement maturity (or cure time) and the temperature at which setting occurs. The cement maturity specifically refers to the time the cement formulation is allowed to set.

In an embodiment, the LTOCC may develop a compressive strength of from about 50 psi to about 10,000 psi, alternatively from about 100 psi to about 9,000 psi, alternatively from about 1,000 psi to about 8,000 psi. The compressive strength of the LTOCC may develop in from about 15 minutes to about 7 hours, alternatively from about 30 minutes to about 5 hours, alternatively from about 1 hour to about 3 hours. In an embodiment, the LTOCC develops an appreciable compressive strength at a temperature of equal to or less than about 80° F., alternatively at equal to or less than about 70° F., alternatively at equal to or less than about 60° F., alternatively at equal to or less than about 50° F., alternatively at equal to or less than about 40° F., alternatively at equal to or less than about 30° F., alternatively at equal to or less than about 20° F., alternatively at equal to or less than about 10° F.

As illustrated in the examples below, the LTOCCs of this disclosure also exhibit a relatively constant viscosity for a period of time after they are initially prepared and while they are being placed in their intended locations in the wellbore, i.e., during the period when the slurry is in motion. Eventually, the cement compositions quickly set such that the viscosity increases from about 35 Bc to equal to or higher than 70 Bc in equal to or less than about 60 minutes, alternatively equal to or less than about 50 minutes, alternatively equal to or less than about 40 minutes, alternatively equal to or less than about 30 minutes, alternatively equal to or less than about 20 minutes, alternatively equal to or less than about 10 minutes, alternatively equal to or less than about 1 minute. This sudden jump in viscosity may be very desirable in preventing unwanted events such as gas or water migration into the slurry because it indicates the quick formation of impermeable mass from a gelled state after placement. This behavior is often referred to as "Right Angle Set" and such cement compositions are called "Right Angle Set Cement Compositions" in reference to the near right angle increase shown in a plot of viscosity over time.

The LTOCC may be used as a wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids include, but are not limited to, cement slurries, drilling fluids or muds, spacer fluids, fracturing fluids or completion fluids, all of which are well known in the art. Without limitation, servicing the wellbore includes positioning the cement composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

In an embodiment, the LTOCC may be introduced to the wellbore to prevent the loss of aqueous or non-aqueous drilling fluids into loss-circulation zones such as voids, vugular zones, and natural or induced fractures while drilling. The components of the LTOCC may be combined in any order desired by the user to form a slurry that may then be placed into a wellbore. The components of the LTOCC may be combined using any mixing device compatible with the composition, for example a bulk mixer. Alternatively, the LTOCC is placed into a wellbore as a single stream and activated by downhole conditions to form a barrier that substantially seals loss circulation zones. In such an embodiment, the LTOCC may be placed downhole through the drill bit forming a composition that substantially eliminates the lost circulation. In yet another embodiment, the LTOCC is formed downhole by the mixing of a first stream comprising one or more cement composition components and a second stream comprising additional cement composition components. For example, the LTOCC may be formed downhole by the mixing of a first stream comprising the MgO and a second stream comprising the $MgCl_2$ and optional additives. Methods for introducing compositions into a wellbore to seal subterranean zones are described in U.S. Pat. Nos. 5,913,364; 6,167,967; and 6,258,757, each of which is incorporated by reference herein in its entirety.

The LTOCC may form a non-flowing, intact mass inside the loss-circulation zone which plugs the zone and inhibits loss of subsequently pumped drilling fluid, which allows for further drilling.

In an embodiment, the LTOCC may be employed in well completion operations such as primary and secondary cementing operations. The LTOCC may be placed into an annulus of the wellbore and allowed to set such that it isolates the subterranean formation from a different portion of the wellbore. The LTOCC thus forms a barrier that prevents fluids in that subterranean formation from migrating into other subterranean formations. Within the annulus, the LTOCC also serves to support a conduit, e.g., casing, in the wellbore. In an embodiment, the wellbore in which the composition is positioned belongs to a multilateral wellbore configuration. It is to be understood that a multilateral wellbore configuration includes at least two principal wellbores connected by one or more ancillary wellbores.

In secondary cementing, often referred to as squeeze cementing, the LTOCC may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

In an embodiment, the LOTCC may serve as a gravel packing fluid in gravel-packing operations. Herein gravel packing refers to a method commonly utilized to prevent migration of sand into wells and to maintain the integrity of subterranean formations. In gravel packing, a permeable screen is placed against the face of a subterranean formation, followed by packing gravel against the exterior of the screen. The size of the gravel particles used for this purpose are larger than the sand particles but are also small enough to ensure that sand cannot pass through voids between the particles. The gravel is typically carried to the subterranean formation by suspending the gravel in a so-called gravel packing fluid and pumping the fluid to the formation. The screen blocks the passage of the gravel but not the fluid into the subterranean formation such that the screen prevents the gravel from being circulated out of the hole, which leaves it in place. The gravel is separated from the fluid as the fluid flows through the screen leaving it deposited on the exterior of the screen.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

Five cementitious slurries were prepared using the indicated amount of light burned MgO, referred to hereafter as LBMO, C-TEK which is a magnesium chloride salt and water, see Table 1. Collectively these slurries are referred to a low temperature oxychloride cement compositions (LTOCC). The slurries were allowed to cure for 72 hours at room temperature and the compressive strength of the slurries evaluated in accordance with API Recommended Practices 10B Twenty-Second Edition, December 1997. The density and compressive strength of these slurries are shown in Table 1. A comparative slurry was prepared using THERMATEK™ LT rigid setting fluid which is a hard-burned MgO for use in the formulation of low temperature cement slurries commercially available from Halliburton Energy Services. The density in pounds per gallon and compressive strengths in pounds per square inch of the slurries are compared in FIG. 1, where RT indicates room temperature.

TABLE 1

| Materials | Slurry #1 | Slurry #2 | Slurry #3 | Slurry #4 | Slurry #5 |
|---|---|---|---|---|---|
| LBMO | 450 | 450 | 450 | 450 | 450 |
| C-TEK | 450 | 450 | 450 | 450 | 450 |
| Water | 300 | 375 | 450 | 525 | 750 |
| Density (ppg)* | 13.7 | 13.3 | 12.9 | 12.5 | 11.3 |
| Compressive strength (psi) | 7200 | 4670 | 3630 | 2100 | 77 |

The results demonstrate that the LTOCC slurries formed with the LBMO generated almost similar compressive strength in the density range of from about 12.5-12.9 ppg as that observed using the THERMATEK™ LT rigid setting fluid at a density of 13.7 ppg. The ability of the slurries comprising LBMO to develop a similar compressive strength at a reduced density is advantageous in terms of cost effectiveness of the slurry.

Example 2

The effect of water on the thickening time of the LTOCC slurries was investigated. The thickening time of the slurries were measured in accordance with API 10B. Specifically, the thickening time for Slurries 1 and 4, from Example 1, were compared at both 60° F. and 77° F. and the results are given in Table 2.

TABLE 2

| | Thickening Time (Slurry #1) (hours:minutes) | Thickening Time (Slurry #4) (hours:minutes) |
|---|---|---|
| 60° F. | 2:07 | 2:10 |
| 77° F. | 1:00 | 1:03 |

The results demonstrate that the thickening time for both slurries was unaffected by water dilution and were almost identical at both 60° F. and 77° F.

Example 3

Figure 2:
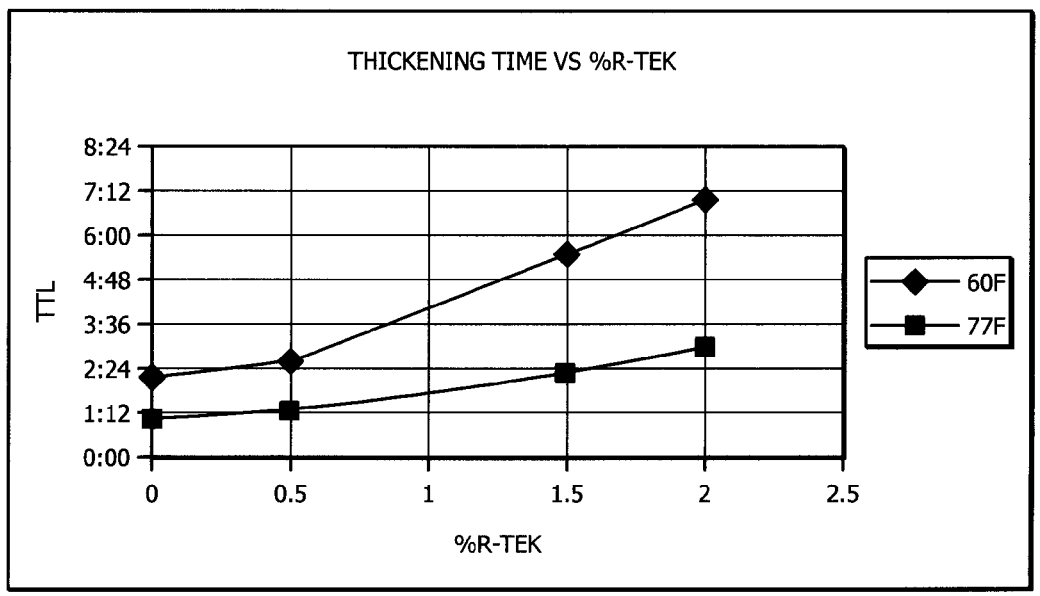
FIG. 2 is a graph of thickening time as a function of inhibitor concentration for Slurry #4 of Example 1.

The effect of an inhibitor on the thickening time of a slurry containing LBMO was investigated. Slurry #4 from Example 1 was prepared and the indicated amount of R-TEK added to the slurry. R-TEK is sodium hexametaphosphate which is an inhibitor commercially available from Halliburton Energy Services. The thickening time of the slurry was measured in accordance with API 10B at both 60° F. and 77° F. and the results are shown in FIG. 2. The results demonstrate that the thickening time of Slurry #4 can be adjusted by the addition of R-TEK.

Example 4

The thickening time and consistency of a slurry comprising 300 grams LBMO, 300 grams C-TEK and 200 grams water was investigated. The thickening time at 60° F., 87° F. and 95° F. are shown in Table 3.

TABLE 3

| Temperature (° F.) | Thickening time (hours:minutes) |
|---|---|
| 60 | 2:07 |
| 87 | 0:48 |
| 95 | 0:38 |

Figure 3:
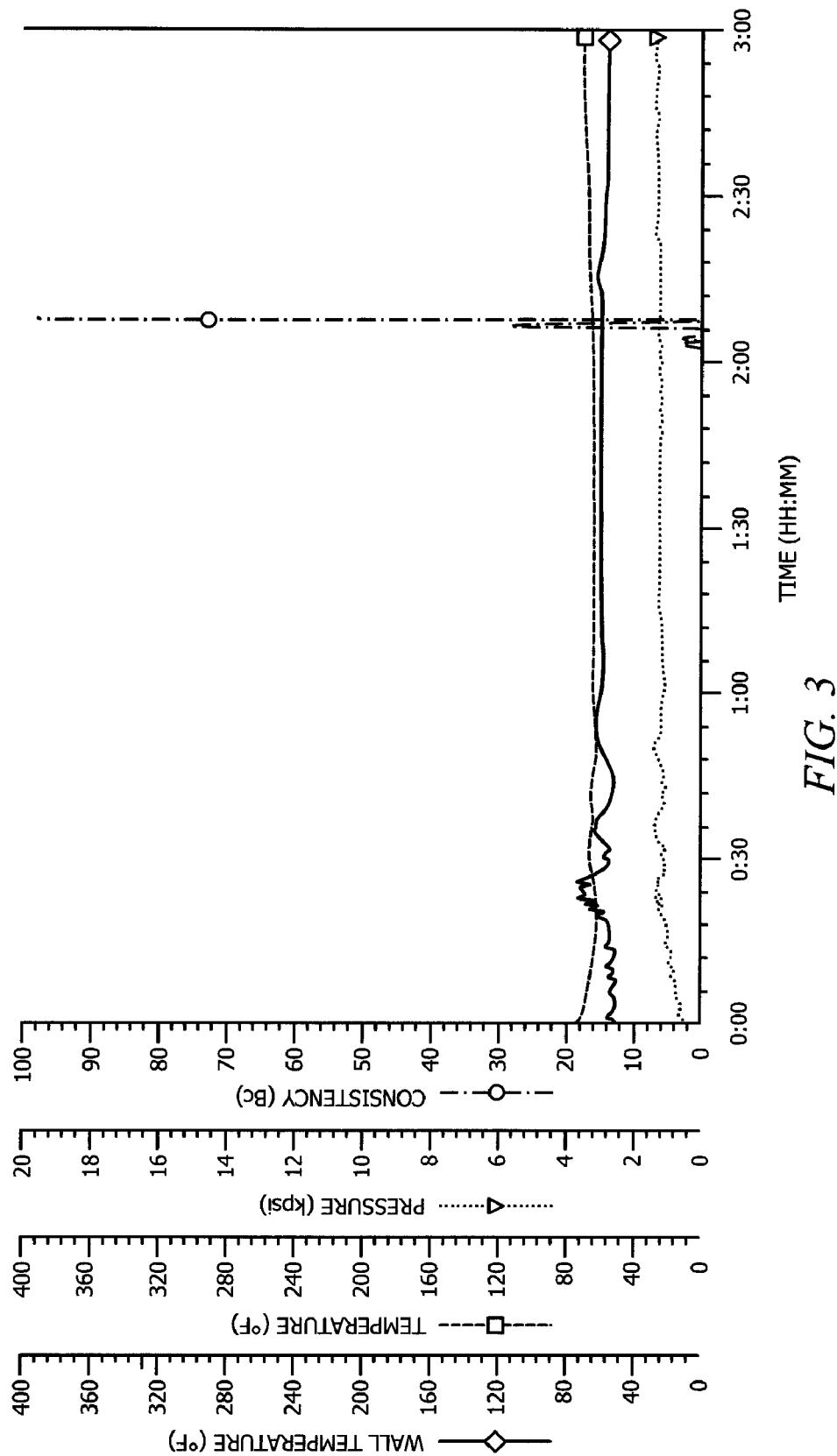
FIG. 3 is a graph of slurry viscosity as a function of temperature.

The thickening time plot in FIG. 3 demonstrates the perfect "Right Angle Set" behavior of the compositions even at 60° F.

While preferred embodiments of the invention have been shown and described, modifications thereof can be made by one skilled in the art without departing from the spirit and teachings of the invention. The embodiments described herein are exemplary only, and are not intended to be lifting. Many variations and modifications of the invention disclosed herein are possible and are within the scope of the invention. Where numerical ranges or limitations are expressly stated, such express ranges or limitations should be understood to include iterative ranges or limitations of like magnitudes falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising:
   placing in the wellbore a cement composition comprising light-burned magnesium oxide, water and an alkaline metal chloride; and
   allowing the composition to set wherein the cement composition displays a right angle set and wherein the composition is allowed to set at a temperature of less than about 80° F.

2. The method of claim 1 wherein the light-burned magnesium oxide has a mean particle size of from about 0.1 to about 20 microns.

3. The method of claim 1 wherein the alkaline metal chloride is magnesium chloride.

4. The method of claim 3 wherein the ratio of light-burned magnesium oxide to magnesium chloride is about 50:50.

5. The method of claim 1 further comprising an inhibitor.

6. The method of claim 5 wherein the inhibitor is selected from the group consisting of sodium hexametaphosphate, potassium magnesium phosphate hexahydrate, potassium magnesium hexametaphosphate and combinations thereof.

7. The method of claim 1 wherein the cement composition develops a compressive strength of from about 50 psi to about 10,000 psi.

8. The method of claim 7 wherein the cement composition develops an appreciable compressive strength in from about 15 minutes to about 7 hours.

9. The method of claim 1 wherein the cement composition has a density of from about 4 ppg to about 23 ppg.

10. The method of claim 1 wherein the cement composition is a gravel packing fluid.

11. The method of claim 1 wherein a viscosity of the cement composition increases from about 35 Bc to equal to or higher than about 70 Bc in equal to or less than about 60 minutes.

12. A method of cementing comprising:
preparing a cement composition comprising a light-burned magnesium oxide, water and an alkaline metal chloride; and
allowing the composition to set wherein the cement composition displays a right angle set and wherein the composition is allowed to set at a temperature of less than about 80° F.

13. The method of claim 12 wherein the light-burned magnesium oxide has a mean particle size of from about 0.1 to about 20 microns.

14. The method of claim 12 wherein the alkaline metal chloride comprises magnesium chloride.

15. The method of claim 14 wherein the ratio of light-burned magnesium oxide to magnesium chloride is about 50:50.

16. The method of claim 12 further comprising an inhibitor.

17. The method of claim 16 wherein the inhibitor is selected from the group consisting of sodium hexametaphosphate, potassium magnesium phosphate hexahydrate, potassium magnesium hexametaphosphate and combinations thereof.

18. The method of claim 12 wherein the cement composition develops a compressive strength of from about 50 psi to about 10,000 psi.

19. The method of claim 18 wherein the cement composition develops an appreciable compressive strength in from about 15 minutes to about 7 hours.

20. The method of claim 12 wherein a viscosity of the cement composition increases from about 35 Bc to equal to or higher than about 70 Bc in equal to or less than about 60 minutes.

* * * * *